Patented Apr. 10, 1928.

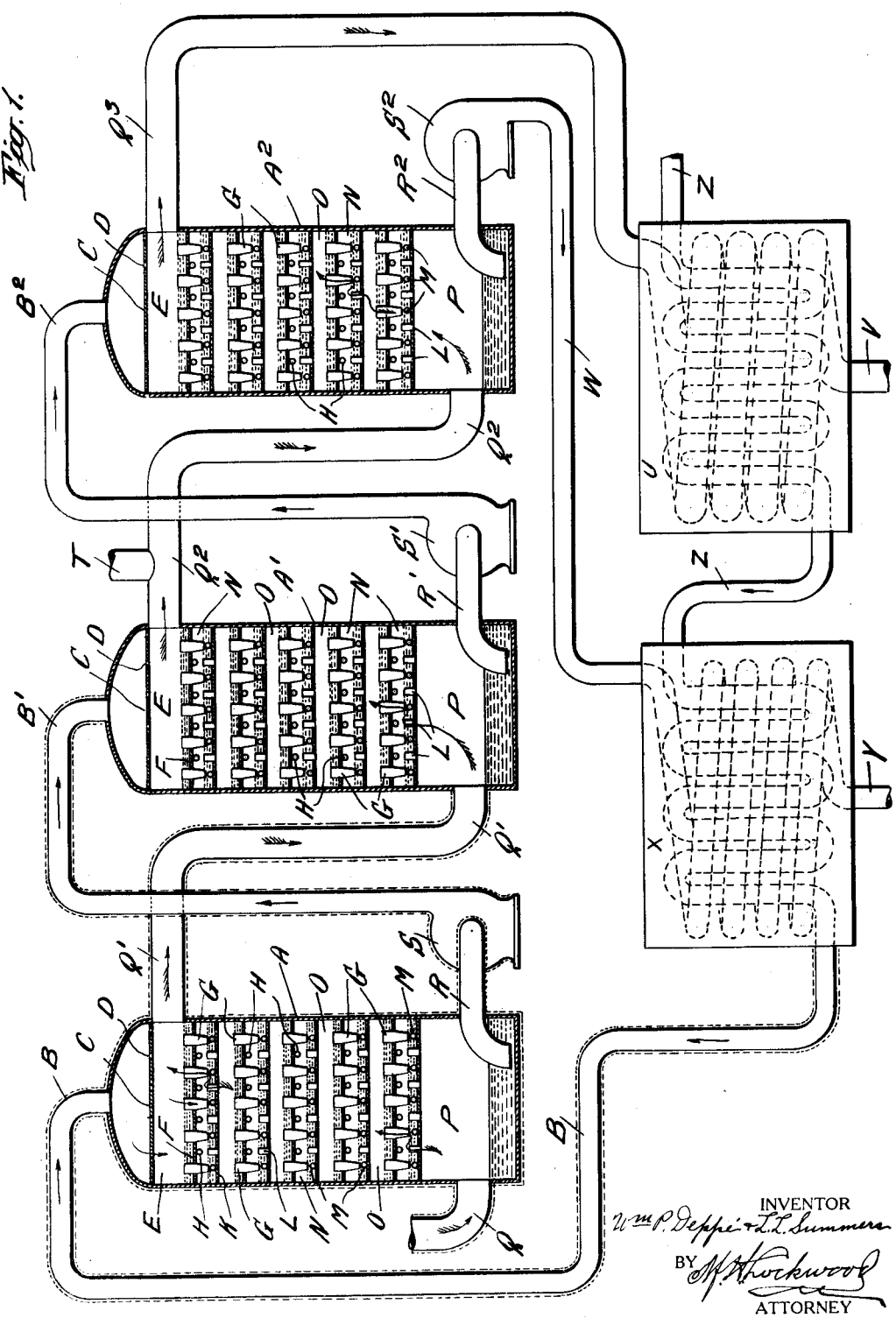

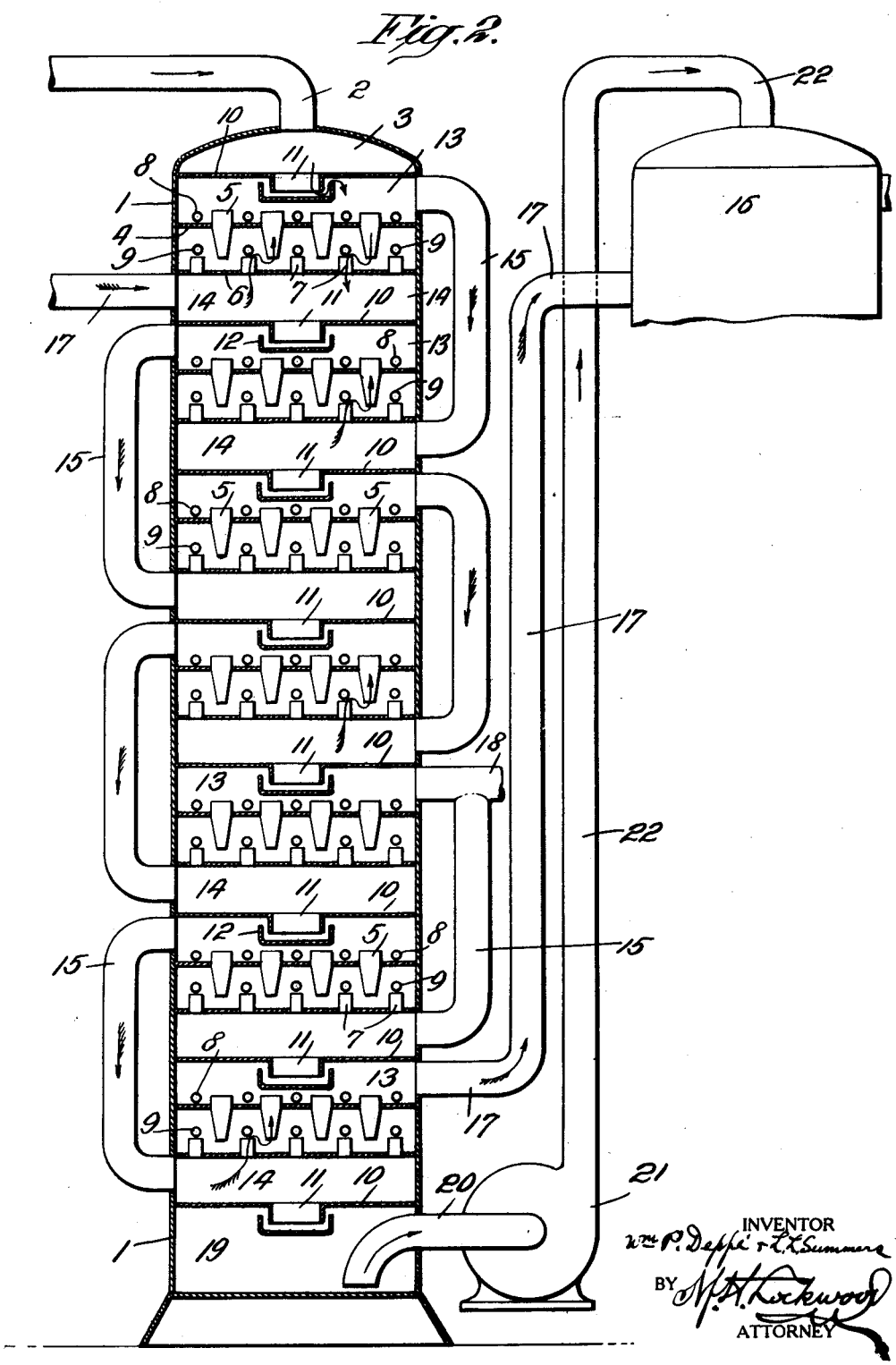

1,666,051

UNITED STATES PATENT OFFICE.

WILLIAM P. DEPPÉ, OF BRIGHTWATERS, AND LELAND L. SUMMERS, OF NEW YORK, N. Y.; LLEWELYN L. B. SUMMERS AND ARTHUR YOUNG ADMINISTRATORS OF SAID LELAND L. SUMMERS, DECEASED.

PROCESS OF DISTILLING HYDROCARBON OILS.

Application filed January 5, 1924. Serial No. 684,479.

Our improved process relates primarily to the production of an improved motor fuel for internal combustion engines, by progressively raising the temperature of crude hydrocarbon oils or hybrid mixtures, while maintaining all the vapors in contact with the liquid being treated in the still, and continuously integrating the vapors and liquid to produce and maintain approximate equilibrium until the desired quality of vapors, at a predetermined temperature, is secured, then removing and condensing the vapors.

Our invention is not confined to any particular mixture of liquids, but relates more particularly to a process of distilling petroleum mixtures, particularly hybrid mixtures of various kinds of petroleum or mixtures of petroleum and benzol and other liquids in the crude form or otherwise, by means of regulating the vapor products arising from these liquids during the process of distillation. In the practice of our process, entirely different products may be secured in the vapor state by controlling the vapors in contact with the liquid before and during distillation and causing the vapors to be intimately mixed or integrated with the liquids from which they are being distilled. In the ordinary process of fractional distillation the vapors arising from the liquid are removed from the still as fast as produced, this process permitting the lighter vapors to be distilled, followed successively by the various vapors of increasing densities, the liquid in the still continuously increasing in density, that is, increasing in average molecular weight, as the lighter products are distilled from it.

We have found that by forcing the vapors arising during distillation, to be intimately integrated with the liquids being distilled, two fundamentally important reactions take place which do not and cannot take place when the liquids are fractionally distilled, as is now common in the industry of refining petroleum. The first reaction results from the fact that in our process the excess of light vapors which are continuously being brought into intimate contact with the liquids, tend to reduce the partial pressure of the heavier vapors distilled, so that these constituents in the liquid are caused to be distilled at much lower temperature under the reduced partial pressure. The second reaction is brought about by maintaining an excess of the lighter vapors present, so as to produce a saturated condition of these vapors, thereby not only preventing the further evaporation of the lighter products, but permitting condensation of the lighter vapors with the remaining heavier products. It is thus possible to regulate what materials or products will be distilled from the liquid undergoing distillation. Because the vapor atmosphere thus maintained has a fundamental action on the character of the products that will be distilled from the liquid, it is possible, by regulating the vapor and removing it only after a certain composition has been reached, to obtain products of distillation having a distinctly different quality from those normally obtained by fractional distillation.

It is obvious that the lighter vapors, first distilling, if removed from possible contact with the liquid, as is done in fractional distillation, cannot exert any further action on the liquid and, by removing these vapors, the liquid is free to continue to increase in density and to produce vapors of increasing density, the density of the succeeding vapors increasing with an increase of temperature. We have found that the increase of density of both the vapor and the liquid in the still may be regulated and controlled by forcing, not only the lighter vapors but all the vapors present, to mix with the fresh vapors over the distilling liquid and to reenter the liquid by continuous integration. Therefore, according to our process, these vapors are not removed from contact with the liquid until a certain desired density has been obtained, which is density in the vapors that has been controlled by forcing a continuous integration of the liquid with the lighter vapors and a definite control of the rate at which the density of the liquid has been allowed to increase.

It is a well known fact that the temperature at which the dynamic equilibrium exists between a liquid and its vapor may be controlled by the pressure of the vapor above the liquid, but in dealing with composite solutions, such as mixtures of petroleum, for any given pressure, the composition of the liquid and the composition of the vapors determine the temperatures at which the definite equilibrium may be maintained. By preserving an intimate contact between a composite liquid and its composite vapors, a control may be exercised over the equilibrium temperature, and a further control, which is fundamental to the composition of the vapor, can be maintained. Our process, therefore, deals fundamentally with the fact that a continuous integration is maintained between the liquid and the vapor and the composition of the vapor is so regulated that the desired composition of vapor is obtained before the vapor is allowed to leave the sphere of influence over the liquid with which it is in substantial equilibrium.

Furthermore, it will be understood that, by our process, it is contemplated to control the final product, not only by the quality of the crudes entering the still, either as hybrid mixtures of natural hydrocarbons or petroleums with other miscible or soluble constituents, but by conducting or forcing into the still and integrating with the liquid, light hydrocarbon of common origin with the liquids treated, or other vapors not normally present in the liquids under treatment, thus giving an additional partial pressure control of the equilibrium vapors finally removed.

We have obtained satisfactory results from our process with apparatus of various kinds; and, therefore, we are not limited to any particular apparatus or method of integrating the vapors and liquid, but for the purpose of illustration, we have shown in the accompanying drawings forms of apparatus capable of carrying out our process and producing the improved motor fuel described.

In the drawings, Fig. 1 shows conventionally and partially in section one form of apparatus for carrying out our process, and Fig. 2 is a section of another form of still, giving a different progressive integration and substantial equilibrium.

Referring to the drawings, it will be seen that, in the apparatus shown in Fig. 1, three stills A, A¹, A² are represented, each provided with an oil inlet pipe B, B¹, B², but it will be understood that the number of stills and oil supply pipes may be varied according to conditions and the results desired. Since the three stills and associated parts shown, are substantially alike, the construction of the first still A will be described and corresponding parts of the other stills will be indicated by the same reference characters. The direction of flow of the oil mixture is indicated by plain arrows and that of the vapors by feathered arrows on the drawings.

The oils or liquids to be treated enter through the pipe B, at the top of the still A, and may discharge upon a suitable plate C provided with perforations D for spraying or breaking up the liquid into fine streams as it passes through the vapor chamber E and falls on the uppermost of a plurality of heated plates F, which may be of the usual type employed in petroleum columns. Preferably the plates F are provided with a plurality of tubular or funnel-shaped openings G, which project above the plates F to provide for retaining a predetermined depth or layer of liquid on the plates. The plates F are preferably heated by contact with steam pipes H, located just below the plates and between the tubular openings G therein. The overflow from the plates F passes down through the tubular openings G to the plates K, which are preferably provided with a plurality of tubular openings L projecting upward between the tubular openings G, just below and practically in line with the heating pipes H. The plates K are preferably heated by another series of steam pipes or coils M, in contact with the upper surface of the plates and preferably located just under the lower ends of the tubular openings G of the plates F. The chamber N, containing the heating pipes or coils may be considered the stage heating chamber. The openings L extend above plates K a uniform amount to allow for a predetermined depth or layer of liquid on the plates, and it will be noted that the lower ends of the tubular openings G are substantially in the same plane as the tops of the openings L, whereby vapors generated or accumulating in the chamber N, between the plates F and K are forced through the liquid in order to pass upward through the tubular openings G, thus facilitating integration and absorption of the vapors by the liquid flowing downward. Vapor chambers O, similar to the chamber E, at the top of the still, are formed between plates K and F, and vapors accumulating therein are driven upward through the openings L, while the liquid overflowing through these openings, falls through the chambers O, thus providing for integration and reabsorption of the lighter vapors with the liquid as it flows by gravity from plate to plate and from heating stage to heating stage. The successive heating stages are adapted to progressively raise the temperature of the liquid as it flows toward the bottom of the column and this may be accomplished by maintaining the series of steam pipes H and M, progressively hotter from top to bottom of the still.

Below the lowermost plate of the column there is preferably provided a larger compartment or chamber P, in the bottom of which the liquid passing through the plates F and K finally accumulates. The upper part of the chamber P serves as a vapor chamber to which light hydrocarbon vapors from an outside source, or vapors from one or the other of the stills, may be admitted through a pipe Q, and, having no other outlet, are compelled to pass up through the openings G and L, thereby being integrated with the liquid and influencing the partial pressure of the other vapors to control the composition of the final product.

All vapors in the first still A finally accumulating in the chamber E are conducted through the pipe $Q^1$ to the chamber P of the second still $A^1$; and the liquid accumulating in the bottom of the chamber P of the first still is drawn out through a pipe R by a pump S and forced through the pipe $B^1$ into the top of the second still $A^1$. The procedure in the second still $A^1$ is the same as described for the first still A except that the heating pipes H and M are maintained at higher temperatures, the temperatures down through the still preferably increasing progressively from the highest temperature of the preceding still A.

Similarly the vapors from the second still $A^1$ are conducted through pipe $Q^2$ to the chamber P of the third still $A^2$, and the liquid from still $A^1$ is forced into the third still $A^2$ through pipe $B^2$ after being drawn through pipe $R^1$ by pump $S^1$. The same operation is then repeated in still $A^2$ except that the temperatures are again staged up and the heating pipes H and M are maintained at progressively higher temperatures, the temperature at the top of still $A^2$ being at or slightly above the highest temperature of the previous still $A^1$. The variations in temperature from heating stage to heating stage in the last still, preferably may be modified to provide merely for the heat required in evaporation thus maintaining approximate equilibrium for the vapors taken off for the final product.

Vapors from the second still $A^1$ may be removed through a branch pipe T and condensed, if the desired quality is reached or, as previously stated, may be conducted through the pipe Q into the first still A, although ordinarily, vapors entering Q are preferably light hydrocarbon vapors.

The vapors from the last still $A^2$ are preferably conducted through pipe $Q^3$ to heat exchanger and condenser U from which it leaves through pipe V, giving the final motor fuel product. The liquid residue from the last still $A^2$ is drawn off through pipe $R^2$ and pump $S^2$ and preferably conducted by pipe W through a second heat exchanger X and discharges at Y. In order to utilize the heat liberated in the heat exchangers U and X, the initial crude petroleum or hybrid mixture, entering the first still A through the pipe B, is conducted through both heat exchangers by the pipe Z, and is therefore, heated when it enters the still.

In order to conserve the heat of the system the pipes B, $B^1$, $B^2$ and Q, $Q^1$, $Q^2$, $Q^3$, and other pipes conducting vapors or hot liquid, as well as the stills, may preferably be insulated against loss of heat, as indicated by dotted lines on Fig. 1 of the drawings.

In the form of apparatus just described, it will be noted that the vapors introduced into the chamber P at the bottom of the respective stills, at once encounters liquid at its highest temperature and, being integrated therewith from stage to stage, will absorb heat to equalize the temperatures even though these vapors and other vapors arising in the lower part of the still are encountering cooler liquid as they pass upward and are integrated therewith; this liquid may be of a higher temperature than the vapors and hence the vapors tend to increase in temperature as they pass upward. Therefore, the vapors in the lower part of the still are not in equilibrium with the vapor leaving the still, but the latter are in approximate equilibrium with the top layer of liquid. Since the hot liquid from the bottom of one still is introduced into the top of the next still, it will be seen that the approximate equilibrium temperature from still to still is staged up until the final product is drawn off.

In order to more satisfactorily obtain substantially complete equilibrium results, it may be considered desirable, under certain conditions to progressively raise the temperature of the vapors as well as the temperature of the liquids, and thereby obtain, or more closely approximate equilibrium between the vapors and liquids leaving the still. With this in view, we have shown in Fig. 2, a modified form of tower still more particularly adapted for progressively heating the vapors during integration and reabsorption by the liquid as the temperature of the latter is progressively raised.

In Fig. 2 the tower still 1 is provided with a pipe 2, for discharging into the top of the still, the liquids or mixtures from which the desired equilibrium product is to be derived. The liquids or mixtures discharge into a chamber 3, and after passing through a trapped opening, hereinafter described, fall upon a heated plate 4, provided with funnel-shaped openings 5, projecting above and below the plates. The funnel openings 5, extend above the plate to maintain on the latter a layer of liquid of desired depth. The over-flow from the plate 4, through the openings 5, passes downward and is received upon plate 6, which is provided with tubular overflow openings 7 projecting above the plate to retain a layer of liquid thereon. The plates 4 and 6 correspond substantially to the plates F and K, previously described, and are arranged for integration of the vapors and liquids in the same manner. In the form shown in Fig. 2, however, the heating pipes are arranged slightly different. One set of steam heating pipes or coils 8 is arranged above the plate 4 and another series of heating pipes 9 is arranged between the plates 4 and 6, preferably over the openings 7 so that vapors coming up through these openings will be heated by striking the pipes.

Below and above each pair of plates 4 and 6 there is provided a vapor-tight partition 10, provided with a single opening 11, trapped at 12, so that the liquids may flow down from stage to stage, but the vapors will not come through.

By this arrangement, it will be seen that two vapor chambers, 13 above and 14 below the pairs of plates 4 and 6 of each heating stage, are provided. The vapor chamber 13 above each stage is preferably connected by pipes 15 with the chamber 14 below the next stage, lower down in the tower. The chamber 13 above the last stage at the bottom of the tower may be connected with the chamber 14 of the first stage at the upper end of the next tower still 16, by means of a pipe 17. As with the previous form described, the vapor chamber 14 of the first stage at the top of the first still may receive any desired vapors from an outside source or vapors from some portion of the still, for instance, by connection with pipe 17. Final product for condensation may be drawn off from any of the stills through the pipe 18, but, preferably, the final substantially equilibrium vapors, for condensation, are taken from the lowermost chamber 13 of the last still.

The liquids in the still, after passing the lowermost heating stage are trapped through partition 10 into a chamber 19 from which it is drawn, through pipe 20 and pump 21, and discharged through pipe 22 into the top of the next still or to a heat exchanger, as previously described.

From the foregoing description of the apparatus shown in Fig. 2, it will be seen that both the vapors and liquids are progressively heated and integrated from top to bottom of the still and the temperatures are preferably increased in successive stages from still to still. This arrangement, therefore, is adapted to maintain an intimate contact of the vapors with the liquids, under equilibrium conditions, practically at every heating stage, as they are progressively heated in the stills. The temperatures at progressive stages are increased from still to still until the desired quality and proper temperature is reached, after which the vapors are removed and condensed thereby producing a motor fuel having peculiar qualities not obtainable by prior methods or processes and not before known as a commercial product.

The operation of our improved process can be readily understood from the foregoing description, but it will be understood that various forms of apparatus may be devised for carrying out our process and, therefore, we do not wish to be limited to the apparatus shown or to the specific details of operation described, for it is well understood that these may be varied and yet accomplish the same results. It is believed that our improved process of distilling crude petroleum or hybrid mixtures thereof with other liquids under approximate equilibrium conditions is broadly novel and, therefore, we do not wish to be limited in the interpretation of our claims to the specific apparatus or steps in the process, for obviously, various modifications may be made therein without departing from the spirit and scope of the invention.

We claim:—

1. The process of distilling oils which comprises vaporizing the oils under equilibrium conditions, integrating the vapors and oils, and progressively raising the temperature of the mixture thereof, while maintaining the vapors and oils in contact, then removing the vapors maintained in substantial equilibrium with the oils and condensing them.

2. The process of distilling liquid oils which comprises heating and vaporizing the oils, maintaining all the vapors produced and the liquid oils, from which the vapors are derived, in intimate contact while progressively raising the temperature of the mixture thereof in successive stages, then removing said vapors when in substantial equilibrium with the liquid oils at a predetermined temperature, and condensing said vapors.

3. The process of distilling petroleum oils which comprises heating and vaporizing the oils, thoroughly integrating all of the vapors and all of the oils and keeping them in intimate contact while progressively raising the temperature of the mixture thereof in successive stages, then removing said vapors while they are in substantial equilibrium with the oils at a predetermined temperature and condensing them.

4. The process of distilling mixtures of oils of different molecular weights, which comprises heating and vaporizing the oils in a closed vessel, keeping the vapors given off and the oils in intimate contact, progressively raising the temperature of the oils and vapors by heating them in successive stages under equilibrium conditions until a predetermined vapor density of the constituents of the oils at a predetermined temperature is reached, then removing and condensing the vapors.

5. The process of distilling mixtures of oils of different molecular weights, which comprises heating and vaporizing the oils in a chamber wherein the volume of oil treated is small compared with the volume of the chamber, thoroughly integrating the vapors given off and the oils and keeping them in intimate contact, progressively raising the temperature of the oils and vapors by heating them in successive stages under equilibrium conditions to thereby obtain a predetermined vapor density of the constituents at a predetermined temperature, then removing and condensing the vapors.

6. The process of distilling mixtures of liquids for producing motor fuels which comprises heating and vaporizing the liquids in a closed vessel in the presence of vapors of the liquids, raising the temperature of the liquids and vapors by heating them in successive stages at progressively increasing temperatures, all the vapors given off being retained under equilibrium conditions in contact with the liquid mixture, continuously integrating the vapors with the liquids until a predetermined temperature is reached, with substantial equilibrium between the vapors and liquids, then removing and condensing the vapors.

7. The process of distilling crude oils and mixtures thereof with other liquids which comprises heating the mixed liquids and vaporizing the same, simultaneously raising the temperature of the liquid mixture and the vapors therefrom by the application of heat in successive stages at progressively increasing temperatures, retaining the mixed vapors in contact and in substantial equilibrium with the mixed liquids, thereby facilitating reabsorption of the vapors, integrating the mixed vapors with the liquid mixture through the successive heating stages until a predetermined partial pressure of the various vapors in equilibrium with the mixed liquids at a predetermined temperature is reached, then removing and condensing the vapors.

8. The process of distilling crude oils and mixtures of oils with other liquids, which comprises progressively heating and vaporizing the mixed liquids to thereby generate vapors of the constituents at increasing temperatures, keeping the vapors in contact with the liquids while continuously integrating the vapors and liquids and maintaining substantial equilibrium therebetween, then removing the vapors when a predetermined partial pressure of the various vapor constituents is reached at a predetermined temperature, and condensing them.

9. The process of distilling hydrocarbon oils and the like which comprises heating and raising the temperature of the liquids in a plurality of successive stages, for generating vapors thereof, the vapors and liquids being maintained in substantial equilibrium, while progressively raising the temperature of the liquids and vapors successively in each stage; maintaining the vapors and liquids in intimate contact to promote absorption and integration of the vapors by and with the liquids, then at a predetermined equilibrium partial pressure of the vapors at a predetermined temperature removing and condensing the vapors.

10. The process of distilling crude oils and mixtures of oils and liquid fuels which comprises progressively vaporizing and raising the temperature of the liquids by heating the mixed liquids and vapors successively at progressively increasing temperatures, maintaining the liquids and the vapors given off in intimate contact, agitating the vapors with the liquids, thereby integrating them and facilitating reabsorption and re-evaporation, maintaining a substantial equilibrium between the vapors and liquids, then removing the vapors while in substantial equilibrium at a predetermined density and temperature and condensing them.

11. The process of distilling crude oils and mixtures of oils and liquid fuels which comprises progressively vaporizing and raising the temperature of the liquids and vapors by heating the mixed liquids and vapors in a plurality of successive stages, maintaining the successive stages at progressively increasing temperatures, maintaining the liquids and the vapors in intimate contact, agitating the vapors and liquids as they flow in opposite directions to thereby facilitate integrating the vapors with the liquids to produce substantial equilibrium, then removing the vapors at a predetermined density and temperature and condensing them.

WILLIAM P. DEPPÉ.
LELAND L. SUMMERS.